March 1, 1955
A. W. FRIESEN
2,702,975
UNDERWATER WEED CUTTER
Filed May 24, 1952
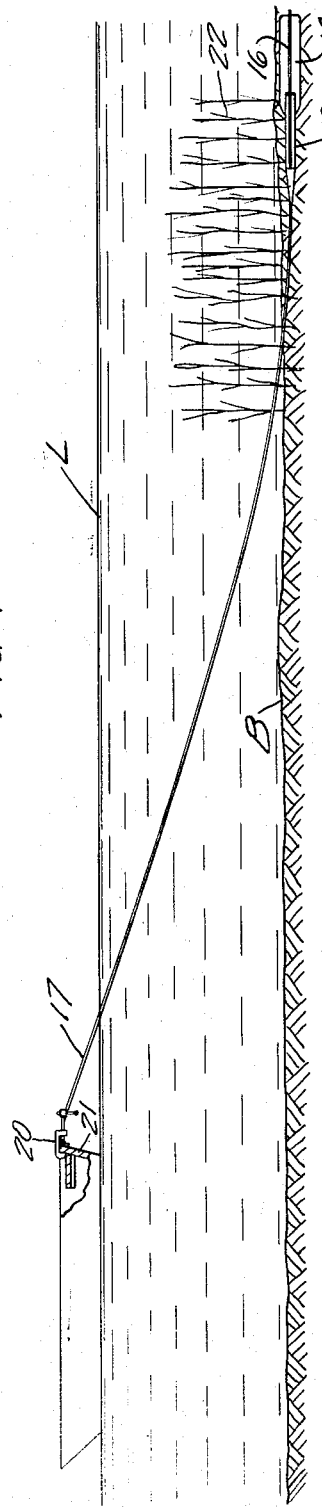
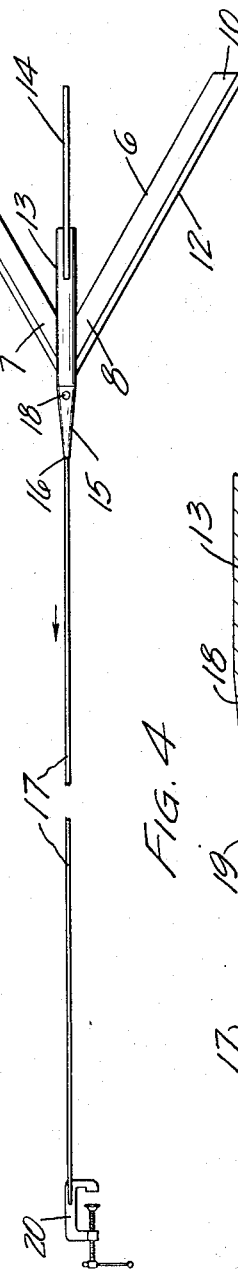
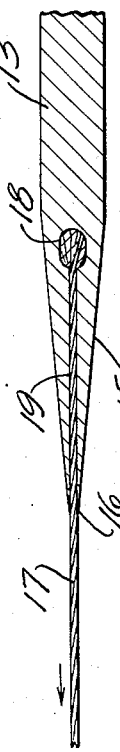
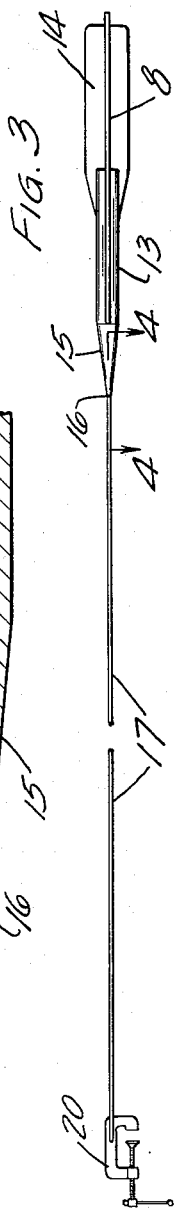
INVENTOR
ALBERT W. FRIESEN
BY Williamson, Williamson, Schroeder & Adams
ATTORNEYS United States Patent Office 2,702,975
Patented Mar. 1, 1955

2,702,975

UNDERWATER WEED CUTTER

Albert W. Friesen, Detroit Lakes, Minn.

Application May 24, 1952, Serial No. 289,819

5 Claims. (Cl. 56—8)

This invention relates to devices for cutting weeds which grow underwater. More particularly, it relates to an underwater weed cutter which is adapted to be drawn along the bottom of the lake behind a boat or other water vehicle.

In relatively shallow lakes, the problem of removing the weeds which grow upon the bottom thereof constantly confronts property owners along the shore of the lake. Some of these weeds are exceptionally difficult to sever and as a result the weed cutting device often moves laterally in the water and permits the tougher plants to be by-passed. Thus with such a weed cutting device it is impossible to completely eliminate the weeds in the lake and only the weeds which can be cut more easily will be removed, while the more fibrous and tougher weeds will escape and remain to grow and reproduce. Thus it can be seen that it is important to provide a device which will prevent such lateral slipping when tough weeds are encountered. It is also important that the device be streamlined and have a regular in contrast to an irregular cutting surface, else the weeds will collect on the cutting surface and an excessive and prohibited amount of power will be required to draw the weed cutter through the weeds.

It is a general object of my invention to provide a novel and improved device for cutting weeds upon lake bottoms which is of cheap and simple construction.

A more specific object is to provide a novel and improved underwater weed cutter of cheap and simple construction and of increased effectiveness while in use.

A still more specific object is to provide a novel and improved underwater weed cutter which will not slip laterally when an exceptionally tenuous weed is encountered.

Another object is to provide an underwater weed cutter which will do an effective job of cutting weeds without requiring an excessive and prohibitive amount of power.

Another object is to provide an underwater weed cutter constructed to preclude the possibility of it becoming laden with an accumulation of cut weeds and thusly increasing the power requirements and consequently reducing the efficiency of the device.

Another object is to provide an underwater weed cutter constructed to positively guide the cutting blades by engaging the lake bottom itself so as to prevent lateral slipping of the blades.

These and other objects and advantages of my invention will more fully appear from the following description made in connection with the accompanying drawings, wherein like reference characters refer to the same or similar parts throughout the several views, and in which:

Fig. 1 is a side elevational view of one embodiment of my invention being drawn behind a boat in position to cut the weeds at the bottom of the lake;

Fig. 2 is an enlarged plan view of an embodiment of my invention;

Fig. 3 is a side elevational view of the same; and

Fig. 4 is a fragmentary sectional view on an enlarged scale taken along approximately line 4—4 of Fig. 3.

One embodiment of my invention may include, as shown in Figs. 1-4, a pair of elongated knife members 5 and 6 which extend at an angle to each other and have forward end portions 7 and 8 respectively and rearward end portions 9 and 10. Each of these knife members 5 and 6 have their outer side edges sharpened as at 11 and 12. These two knife members 5 and 6 are connected at their forward end portions 7 and 8 respectively to form an essentially V-shaped structure. The two knife members 5 and 6 extend in a common plane.

A guide member indicated generally as 13 connects the two knife members 5 and 6 at their forward end portions 7 and 8 as best shown in Fig. 2. This guide member 13 is generally cylindrical and extends rearwardly between the angle formed between the two knife members 5 and 6 so as to bisect that angle. The guide member is comprised of a material substantially heavier than water such as iron, and carries at its rearward end portion a fin member 14 which extends in a plane normal to the common plane of the knife members 5 and 6 as best shown in Figs. 2 and 3. Thus, it can be seen that when the V-shaped cutting structure is drawn along a horizontal plane the fin member 14 will extend vertically. As best shown in Fig. 3, the fin member 14 extends both above and below the common plane of the knife members 5 and 6 so that when the V-shaped structure is drawn through the mud, the fin 14 is certain to engage the mud at the bottom of the lake to provide a positive guiding action and thereby maintain the movement of the knife members in a true line behind the boat. As will be evident from inspecting the drawing, the fin member 14 provides means for discouraging lateral shifting by virtue of water resistance to the flat and thin blade portion thereof and, furthermore, by providing a straight skid portion at the lower edge thereof for cutting a groove in the mud as the weed cutting device is pulled forwardly.

Connected to the forward end portion of the guide member 13 is a piercer element 15. This piercer element is substantially cylindrical and of the same diameter as the guide member 13 at the point where it joins the latter so that it forms substantially an extension thereof, being rigidly formed therewith as by the integral construction shown in Fig. 4. This piercer element 15 tapers toward its forward end portion 16 and here its diameter is reduced to substantially the diameter of the cable 17 to which it is connected. As best shown in Fig. 4, the cable 17 extends coaxially of the piercer element 15 and the forward end portion of the piercer element tapers so that there is no possibility of weeds being engaged thereby when the weed cutter is being drawn through the water.

The piercer element 15 has a recess 18 extending transversely into the main body portion thereof to communicate with a passage 19 which extends longitudinally and axially thereof from the forward end toward the knives 5 and 6. The cable 17 is inserted into this elongated opening 19 until the rearward end portions thereof are accessible through the opening 18. The strands of the cable 17 are then spread and separated and a molten material is poured into the recess 18 and, upon cooling, securely attaches the cable to the piercer element.

A clamp 20 is used to secure the cable 17 to the rear end of a boat 21. When the clamp is connected to the boat and the V-shaped structure is drawn along the bottom B of the lake L the knife members 5 and 6 will lie in a substantially horizontal plane and be drawn along the bottom of the lake between the weeds 22.

As the V-shaped structure is drawn through the weeds 22 the piercer element 15 separates the weeds slightly so that they will slide along the sharpened edges 11 and 12 of the knife members 5 and 6. Thus there is no opportunity for weeds to become entangled on the weed cutter and there is no opportunity for weeds to become accumulated to create a drag which would require a maximum of power. It can be readily seen that substantially less power will therefore be required to draw my weed cutter through the weeds.

The heavy nature of the guide member 13 holds the entire cutter against the bottom B of the lake and the fin member 14 will sink into the mud at the bottom of the lake sufficiently to prevent the V-shaped structure from moving to either side when an exceptionally tenuous weed is encountered. To the contrary, the guide member 14 will cause the entire structure to move freely along a line true with the flexible cable and will cause the sharpened edges 11 and 12 to be drawn across such a weed with sufficient pressure to cause the same to be severed. Thus there is no opportunity for the weed cutter to slide to one side of such a weed and thereby permit the weed to remain intact.

Thus it can be seen that I have provided a novel and improved underwater weed cutter capable of being manufactured cheaply and simply and which will operate with increased effectiveness. It can be readily seen that my weed cutter will remove the weeds from the bottom of the lake in an improved manner and will insure against the more tenuous weeds being permitted to remain at the bottom of the lake as has been the case with weed cutting devices previously known.

It should also be noted that the manner with which I connect my weed cutting structure with the cable 17 positively prevents an accumulation of weeds from forming thereupon. There is no opportunity for weeds to collect around the forward end of the structure since the piercer element 15 is tapered at its forward end to substantially the same diameter as the cable. If weeds were permitted to accumulate on such a cutter it will not cut at all and the accumulated weeds would act like a surf board, causing the cutter to rise to the surface where of course it is useless. It is imperative therefore that such a weed cutter be so constructed as to eliminate any possibility of weeds accumulating along its cutting surface, and my weed cutter has proved very successful in this respect.

It will of course be understood that various changes may be made in the form, details, arrangements and proportions of the various parts without departing from the scope of my invention.

What is claimed is:

1. An underwater plant cutter for use in cutting plants such as weeds on lake bottoms and the like, said cutter including a pair of elongated knife members extending at an angle to each other in a common plane to together form a V-shaped structure and having their outer side edges sharpened, said knife members having forward and rearward end portions, an elongated guide member connecting rigidly said knife members at their forward end portions and extending rearwardly therefrom, a piercer element connected to said guide member and extending forwardly therefrom to constitute in effect an extension thereof, a flexible towing cable connected to said piercer element and extending forwardly and coaxially from the forward end thereof, said piercer element being tapered at its forward end to substantially the diameter of said cable, the rearward end portion of said guide member extending rearwardly between said knife members substantially equi-distant therefrom and carrying at least one fin thereupon to adapt the same to positively engage the mud at the bottom of the lake and thereby guide said knife members along a true line behind said cable.

2. In an underwater plant cutter, cutting structure including a pair of elongated knife members having forward and rearward end portions and extending at an angle to each other in a common plane and connected rigidly at their forward end portions to together form a V-shaped structure and having their outer side edges sharpened, and an elongated generally cylindrical guide member connected to the forward end portions of said knife members and extending rearwardly therebetween substantially equi-distant from said knife members, said guide member carrying at least one fin extending radially therefrom to freely engage the mud at the bottom of the lake and thereby cause said knife members to follow a true line when connected by their forward end portions to a flexible towing means.

3. A device for underwater use in cutting weeds adjacent their roots at the bottom of a body of water such as a lake, said device comprising a knife element substantially lying in one plane and having a forward apex and a cutting edge extending outwardly and rearwardly from said apex at each side thereof, an elongated guide member having at least one flat and thin fin and a straight skid portion rigidly attached to said knife element and forming a plane intersecting the plane of said knife element in a line at substantially the same angle with each of said cutting edges, said fin being disposed in a plane lateral to the plane of said knife element to provide stability against lateral shifting while the device is moving through the water, the skid portion extending below the plane of the knife element to provide groove-cutting and spacing for the device while moving in straight line contact with the bottom of the lake.

4. A device for underwater use in cutting weeds adjacent their roots at the bottom of a body of water such as a lake, said device comprising a knife element substantially lying in one plane and having a forward apex for securing to a flexible cable in smooth flowing lines and a cutting edge extending outwardly and rearwardly from said apex at each side thereof, an elongated guide member having at least one flat and thin fin and a straight skid portion attached to said knife element, said fin lying in a plane normal to that of said knife element and extending thereabove to provide lateral stability while moving through the water and a skid portion extending in the plane of said fin below the plane of said knife element to provide a bottom-engaging and groove-cutting means for maintaining the moving device in straight line contact with the bottom of the lake.

5. In an underwater plant cutter, cutting structure including a pair of elongated knife members having forward and rearward end portions extending at an angle to each other in a common plane and connected together rigidly at their forward end portions to form a V-shaped structure and having their outer edges sharpened, and an elongated guide member secured to the forward end portions of said knife members and extending rearwardly therebetween and substantially bisecting said V-shaped structure, said guide member carrying at least one fin extending radially therefrom to freely engage mud and the like at the bottom of a body of water and thereby cause said knife members to follow a true line when connected by their forward end portions to a flexible towing means.

References Cited in the file of this patent

UNITED STATES PATENTS

| 105,996 | Stone | Aug. 2, 1870 |
| 951,812 | Gilbert | Mar. 15, 1910 |

FOREIGN PATENTS

| 403,810 | Germany | Oct. 8, 1924 |
| 496,260 | Great Britain | Nov. 28, 1938 |